(12) United States Patent
Järvinen et al.

(10) Patent No.: US 10,251,009 B2
(45) Date of Patent: Apr. 2, 2019

(54) AUDIO SCENE APPARATUS

(71) Applicant: NOKIA TECHNOLOGIES OY, Espoo (FI)

(72) Inventors: Kari Juhani Järvinen, Tampere (FI); Antti Eronen, Tampere (FI); Juha Henrik Arrasvuori, Tampere (FI); Roope Olavi Järvinen, Lempäälä (FI); Miikka Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/927,261

(22) Filed: Mar. 21, 2018

(65) Prior Publication Data
US 2018/0220250 A1    Aug. 2, 2018

Related U.S. Application Data

(63) Continuation of application No. 14/391,121, filed as application No. PCT/IB2012/051963 on Apr. 19, 2012, now Pat. No. 9,955,280.

(51) Int. Cl.
*H04M 3/56* (2006.01)
*H04S 7/00* (2006.01)
*G10L 21/0216* (2013.01)

(52) U.S. Cl.
CPC .............. *H04S 7/302* (2013.01); *H04M 3/568* (2013.01); *H04S 7/301* (2013.01); *G10L 2021/02161* (2013.01); *H04S 7/30* (2013.01); *H04S 2400/01* (2013.01); *H04S 2400/11* (2013.01); *H04S 2420/03* (2013.01)

(58) Field of Classification Search
CPC .......... G10L 2021/02161; H04M 3/568; H04S 7/30; H04S 7/301; H04S 7/302; H04S 2400/01; H04S 2400/11; H04S 2420/03
See application file for complete search history.

(56) References Cited

U.S. PATENT DOCUMENTS 6,011,851 A    1/2000   Connor et al.
7,433,716 B2  10/2008   Denton
(Continued)

FOREIGN PATENT DOCUMENTS

EP    1 168 783 A2    1/2002
EP    2 217 005 A1    8/2010
(Continued)

OTHER PUBLICATIONS

"3rd Generation Partnership Project, Technical Specification Group Services and System Aspects; IP Multimedia Subsystem (IMS); Multimedia Telephony; Media handling and interaction (Release 11)", 3GPP TS 26.114, V11.2.0, Nov. 2011, pp. 1-259.
(Continued)

*Primary Examiner* — Brenda C Bernardi
(74) *Attorney, Agent, or Firm* — Alston & Bird LLP

(57) ABSTRACT

An apparatus comprising: a first audio signal analyzer configured to analyze a first audio signal to determine at least one audio source, wherein the at least one audio source has a virtual location; a second audio signal analyzer configured to analyze a second audio signal to determine at least one localized audio source, wherein the second audio signal is generated from the apparatus audio environment; and a repositioner configured to reposition the virtual location of the at least one audio source dependent on the at least one localized audio source.

21 Claims, 11 Drawing Sheets

(56) References Cited

U.S. PATENT DOCUMENTS

| | | |
|---|---|---|
| 7,720,212 B1 | 5/2010 | Jouppi et al. |
| 2002/0151996 A1 | 10/2002 | Wilcock et al. |
| 2003/0081115 A1 | 5/2003 | Curry et al. |
| 2007/0160230 A1 | 7/2007 | Nakagomi |
| 2008/0130908 A1 | 6/2008 | Cohen et al. |
| 2009/0097677 A1 | 4/2009 | Shaffer et al. |
| 2009/0116652 A1 | 5/2009 | Kirkeby et al. |
| 2009/0147967 A1 | 6/2009 | Ishibashi et al. |
| 2010/0111325 A1 | 5/2010 | Naoshi |
| 2010/0202621 A1 | 8/2010 | Murata et al. |
| 2011/0116638 A1 | 5/2011 | Son et al. |
| 2012/0078398 A1 | 3/2012 | Xu et al. |
| 2012/0114130 A1 | 5/2012 | Lovitt |
| 2012/0128174 A1 | 5/2012 | Tammi et al. |
| 2012/0288125 A1 | 11/2012 | Mukund |
| 2014/0226842 A1 | 8/2014 | Shenoy et al. |

FOREIGN PATENT DOCUMENTS

| | | |
|---|---|---|
| EP | 2 434 491 A1 | 3/2012 |
| WO | WO 2007/122749 A1 | 11/2007 |
| WO | WO 2012/164153 A1 | 12/2012 |

OTHER PUBLICATIONS

Carlile et al., "Frequency Bandwidth and Multi-Talker Environments", 120th Audio Engineering Society Convention, May 2006, pp. 6634-6858.

Extended European Search Report received for corresponding European Patent Application No. 12874756.5, dated Nov. 17, 2015, 10 pages.

International Search Report and Written Opinion received for corresponding Patent Cooperation Treaty Application No. PCT/IB2012/051963, dated Apr. 15, 2013, 14 pages.

Nishimura, "Audio Information Hiding Based on Spatial Masking", Sixth International Conference on Intelligent Information Hiding and Multimedia Signal Processing, Oct. 15-17, 2010, pp. 522-525.

Office Action for European Application No. 12874756.5 dated Sep. 29, 2017, 9 pages.

Office Action for U.S. Appl. No. 14/391,121 dated Aug. 3, 2017.

Office Action for U.S. Appl. No. 14/391,121 dated Aug. 30, 2016.

Office Action for U.S. Appl. No. 14/391,121 dated Jan. 6, 2017.

Potty et al., "Azimuth-Dependent Spatialization for a Teleconference Audio Display", National Conference on Communications, Jan. 28-30, 2011, 5 pages.

Notice of Allowance issued for U.S. Appl. No. 14/391,121 dated Dec. 12, 2017.

AUDIO SCENE APPARATUS

CROSS REFERENCE TO RELATED APPLICATIONS

This application is a continuation of U.S. application Ser. No. 14/391,121, filed Oct. 7, 2014, which is a national phase entry International Application No. PCT/IB2012/051963, filed Apr. 19, 2012, the entire contents of which are incorporated herein by reference.

FIELD

The present application relates to apparatus for the processing of audio signals to enable alignment or spatialisation of audio signals. The invention further relates to, but is not limited to, apparatus for processing of audio signals to enable alignment or spatialisation of audio signals from mobile devices.

BACKGROUND

In conventional situations the environment comprises sound fields with audio sources spread in all three spatial dimensions. The human hearing system controlled by the brain has evolved the innate ability to localize, isolate and comprehend these sources in the three dimensional sound field. For example the brain attempts to localize audio sources by decoding the cues that are embedded in the audio wavefronts from the audio source when the audio wavefront reaches our binaural ears. The two most important cues responsible for spatial perception is the interaural time differences (ITD) and the interaural level differences (ILD). For example an audio source located to the left and front of the listener takes more time to reach the right ear when compared to the left ear. This difference in time is called the ITD. Similarly, because of head shadowing, the wavefront reaching the right ear gets attenuated more than the wavefront reaching the left ear, leading to ILD. In addition, transformation of the wavefront due to pinna structure, shoulder reflections can also play an important role in how we localize the sources in the 3D sound field. These cues therefore are dependent on person/listener, frequency, location of audio source in the 3D sound field and environment he/she is in (for example the whether the listener is located in an anechoic chamber/auditorium/living room).

The 3D positioned and externalized audio sound field has become the de-facto natural way of listening.

Telephony and in particular wireless telephony is well known in implementation. Often telephony is carried out in environmentally noisy situations where background noise causes difficulty in understanding what the other party is communicating. This typically results in requests to repeat what the other party has said or stopping the conversation until the noise has disappeared or the user has moved away from the noise source. This is particularly acute in multi-party telephony (such as conference calls) where one or two participants are unable to follow the discussion due to local noise causing serve distraction and unnecessarily lengthening the call duration. Even where the surrounding or environmental noise does not prevent the user from understanding what the other party is communicating it can still be very distracting and annoying preventing the user from focusing completely on what the other party is saying and requiring extra effort in listening.

However, completely dampening or suppressing the environmental or live noise is not desirable as it may provide an indication of an emergency or a situation requiring the user's attention more than the telephone call. Thus active noise cancellation can unnecessarily isolate the user from their surroundings. This could be dangerous where emergency situations occur near to the listener as it could prevent the listener from hearing warning signals from the environment.

SUMMARY

Aspects of this application thus provide an audio signal alignment process whereby apparatus can use audio signal processing to position suitable audio signal sources to audio-wise 'empty' spatial locations.

There is provided according to a first aspect an apparatus comprising at least one processor and at least one memory including computer code for one or more programs, the at least one memory and the computer code configured to with the at least one processor cause the apparatus to at least perform: analysing a first audio signal to determine at least one audio source wherein the at least one audio source has a virtual location; analysing a second audio signal to determine at least one localised audio source, wherein the second audio signal is generated from the apparatus audio environment; and repositioning the virtual location of the at least one audio source dependent on the at least one localised audio source.

Repositioning the virtual location of the at least one of the audio source may cause the apparatus to perform: determining a spectra of the at least one localised audio source is similar to a spectra of the at least one audio source; and repositioning the virtual location of the at least one audio source further away from the at least one localised audio source.

Repositioning the virtual location of the at least one audio source further away from the at least one localised audio source may cause the apparatus to perform repositioning the virtual location of the at least one audio source to the opposite direction of a direction of the at least one localised audio source.

Analysing the first audio source may determine at least two audio sources and analysing the second audio signal may determine at least two localised audio sources, wherein repositioning the virtual location of at least one of the at least two audio source may cause the apparatus to perform: pairing each audio source with a localised audio source; determining a spectral distance between each pair; sorting each pair in order of spectral distance; selecting pairs in the order sorted; and repositioning the virtual location of the audio source associated with the pair selected to one of: the opposite position to a position of the localised audio source associated with the pair; and a position closest to the opposite position to a position of the localised audio source where the opposite position to a position of the localised audio source is occupied by a further audio source or localised audio source.

The apparatus may be further caused to perform repeating: pairing each audio source with a localised audio source; determining a spectral distance between each pair; sorting each pair in order of spectral distance; selecting pairs in the order sorted; and repositioning the virtual location of the audio source associated with the pair selected to one of: the opposite position to a position of the localised audio source associated with the pair; and a position closest to the opposite position to a position of the localised audio source where the opposite position to a position of the localised audio source is occupied by a further audio source or localised audio source, until no further significant improvement is possible.

Repositioning the virtual location of the at least one of the audio source may cause the apparatus to perform: determining a direction difference between the at least one localised audio source and the virtual location of the at least one audio source is less than a determined value; and repositioning the virtual location of the at least one audio source further away from the at least one localised audio source.

Repositioning the virtual location of the at least one of the audio source may cause the apparatus to perform: determining the at least one audio source is a speech audio source; and repositioning the virtual location of the at least one audio source further away from the at least one localised audio source.

Repositioning the virtual location of the at least one of the audio source may cause the apparatus to perform: determining the at least one audio source is a low energy audio source; and repositioning the virtual location of the at least one audio source further away from the at least one localised audio source.

The apparatus may be further caused to perform receiving an indication identifying the at least one audio source, and repositioning the virtual location of the at least one audio source dependent on the at least one localised audio source causes the apparatus to perform repositioning the virtual location of the at least one of the audio source identified further away from the at least one localised audio source.

The first audio signal may be at least one of: a received audio signal via a receiver; and a retrieved audio signal via a memory.

Analysing a first audio signal to determine at least one audio source may cause the apparatus to perform: dividing the first audio signal into a first number of frequency bands; determining for the first number of frequency bands a second number of dominant audio directions; ordering the second number of dominant audio directions; determining a third number of audio sources to be found; and selecting the ordered third number of dominant audio directions as the audio source virtual directions.

Analysing a second audio signal to determine at least one localised audio source, wherein the second audio signal is generated from the apparatus audio environment may cause the apparatus to perform: dividing the second audio signal into a first number of frequency bands; determining for the first number of frequency bands a second number of dominant audio directions; and selecting the dominant audio directions where their associated audio components are greater than a determined noise threshold value as the audio source localised directions.

The apparatus may be further caused to perform receiving the second audio signal from at least two microphones, wherein the microphones are located on or neighbouring the apparatus.

The apparatus may be further caused to perform receiving at least one user input associated with at least one audio source, wherein repositioning the virtual location of the at least one audio source further may cause the apparatus to perform repositioning the virtual location of the at least one audio source dependent on the at least one user input associated with the at least one audio source.

According to a second aspect there is provided a method comprising: analysing a first audio signal to determine at least one audio source, wherein the at least one audio source has a virtual location; analysing a second audio signal to determine at least one localised audio source, wherein the second audio signal is generated from the apparatus audio environment; and repositioning the virtual location of the at least one audio source dependent on the at least one localised audio source.

Repositioning the virtual location of the at least one of the audio source may comprise: determining a spectra of the at least one localised audio source is similar to a spectra of the at least one audio source; and repositioning the virtual location of the at least one audio source further away from the at least one localised audio source.

The repositioning the virtual location of the at least one audio source further away from the at least one localised audio source may comprise repositioning the virtual location of the at least one audio source to the opposite direction of a direction of the at least one localised audio source.

Analysing the first audio source may determine at least two audio sources and analysing the second audio signal may determine at least two localised audio sources, wherein repositioning the virtual location of at least one of the at least two audio source may comprise: pairing each audio source with a localised audio source; determining a spectral distance between each pair; sorting each pair in order of spectral distance; selecting pairs in the order sorted; and repositioning the virtual location of the audio source associated with the pair selected to one of: the opposite position to a position of the localised audio source associated with the pair; and a position closest to the opposite position to a position of the localised audio source where the opposite position to a position of the localised audio source is occupied by a further audio source or localised audio source.

The repositioning the virtual location of at least one of the at least two audio source may be configured to repeat: pairing each audio source with a localised audio source; determining a spectral distance between each pair; sorting each pair in order of spectral distance; selecting pairs in the order sorted; and repositioning the virtual location of the audio source associated with the pair selected to one of: the opposite position to a position of the localised audio source associated with the pair; and a position closest to the opposite position to a position of the localised audio source where the opposite position to a position of the localised audio source is occupied by a further audio source or localised audio source, until no further significant improvement is possible.

Repositioning the virtual location of the at least one of the audio source may comprise: determining a direction difference between the at least one localised audio source and the virtual location of the at least one audio source is less than a determined value; and repositioning the virtual location of the at least one audio source further away from the at least one localised audio source.

The repositioning the virtual location of the at least one of the audio source may comprise: determining the at least one audio source is a speech audio source; and repositioning the virtual location of the speech audio source further away from the at least one localised audio source.

The repositioning the virtual location of the at least one of the audio source may comprise determining the at least one audio source is a low energy audio source, and repositioning the virtual location of the low energy audio source further away from the at least one localised audio source.

The method may further comprise: receiving an indication identifying the at least one audio source; and repositioning the virtual location of the at least one audio source dependent on the at least one localised audio source may comprise repositioning the virtual location of the at least one of the audio source identified further away from the at least one localised audio source.

The first audio signal may be at least one of: a received audio signal via a receiver; and a retrieved audio signal via a memory.

Analysing a first audio signal to determine at least one audio source may comprise: dividing the first audio signal into a first number of frequency bands; determining for the first number of frequency bands a second number of dominant audio directions; ordering the second number of dominant audio directions; determining a third number of audio sources to be found; and selecting the ordered third number of dominant audio directions as the audio source virtual directions.

Analysing a second audio signal to determine at least one localised audio source, wherein the second audio signal is generated from the apparatus audio environment may comprise: dividing the second audio signal into a first number of frequency bands; determining for the first number of frequency bands a second number of dominant audio directions; and selecting the dominant audio directions where their associated audio components are greater than a determined noise threshold value as the audio source directions.

The method may further comprise receiving the second audio signal from at least two microphones, wherein the microphones are located on or neighbouring the apparatus.

The method may further comprise receiving at least one user input associated with at least one audio source, wherein repositioning the virtual location of the at least one audio source further may comprise repositioning the virtual location of the at least one audio source dependent on the at least one user input associated with the at least one audio source.

According to a third aspect there is provided an apparatus comprising: a first audio signal analyser configured to analyse a first audio signal to determine at least one audio source wherein the at least one audio source has a virtual location; a second audio signal analyser configured to analyse a second audio signal to determine at least one localised audio source, wherein the second audio signal is generated from the apparatus audio environment; and a repositioner configured to reposition the virtual direction of the at least one audio source dependent on the at least one localised audio source.

The repositioner may be configured to: determine a spectra of the at least one localised audio source is similar to a spectra of the at least one audio source; and reposition the virtual direction of the at least one audio source further away from the at least one localised audio source.

The repositioner may be configured to reposition the virtual direction of the at least one audio source to the opposite direction of a direction of the at least one localised audio source.

The first signal analyser may be configured to determine at least two audio sources and the second signal analyser may be configured to determine at least two localised audio sources, wherein the repositioner may be configured to: pair each audio source with a localised audio source; determine a spectral distance between each pair; sort each pair in order of spectral distance; select pairs in the order sorted; and reposition the virtual direction of the audio source associated with the pair selected to one of: the opposite position to a position of the localised audio source associated with the pair; and a position closest to the opposite position to a position of the localised audio source where the opposite position to a position of the localised audio source is occupied by a further audio source or localised audio source.

The repositioner may be configured to repeat: pairing each audio source with a localised audio source; determining a spectral distance between each pair; sorting each pair in order of spectral distance; selecting pairs in the order sorted; and repositioning the virtual location of the audio source associated with the pair selected to one of: the opposite position to a position of the localised audio source associated with the pair; and a position closest to the opposite position to a position of the localised audio source where the opposite position to a position of the localised audio source is occupied by a further audio source or localised audio source, until no further significant improvement is possible.

The repositioner may be configured to: determine a direction difference between the at least one localised audio source and the virtual direction of at least one audio source is less than a determined value; and reposition the virtual position of the at least one audio source further away from the at least one localised audio source.

The repositioner may be configured to: determine the at least one audio source is a speech audio source; and reposition the virtual location of the speech audio source further away from the at least one localised audio source.

The repositioner may be configured to: determine the at least one audio source is a low energy audio source; and reposition the virtual location of the low energy audio source further away from the at least one localised audio source.

The apparatus may further comprise a receiver configured to receive an indication identifying the at least one audio source, and the repositioner is configured to reposition the virtual location of the at least one of the audio source identified further away from the at least one localised audio source.

The first audio signal may be at least one of: a received audio signal via a receiver; and a retrieved audio signal via a memory.

The first audio analyser may comprise: at least one filter configured to divide the first audio signal into a first number of frequency bands; a dominant source analyser configured to determine for the first number of frequency bands a second number of dominant audio directions; a sorter configured to order the second number of dominant audio directions; a limiter configured to determine a third number of audio sources to be found; and a selector configured to select the ordered third number of dominant audio directions as the virtual location audio source directions.

The second signal analyser may comprise: at least one filter configured to divide the second audio signal into a first number of frequency bands; a dominant source analyser configured to determine for the first number of frequency bands a second number of dominant audio directions; and a selector configured to select the dominant audio directions where their associated audio components are greater than a determined noise threshold value as the localised audio source directions.

The apparatus may comprise an input configured to receive the second audio signal from at least two microphones, wherein the microphones are located on or neighbouring the apparatus.

The apparatus may comprise an user interface input configured to receive at least one user input associated with at least one audio source, wherein the repositioner may comprise a user interface repositioner configured to reposition the virtual location of the at least one audio source dependent on the at least one user input associated with the at least one audio source.

According to a fourth aspect there is provided an apparatus comprising: means for means for analysing a first audio signal to determine at least one audio source wherein the at least one audio source has a virtual location; means for analysing a second audio signal to determine at least one localised audio source, wherein the second audio signal is generated from the apparatus audio environment; and means for repositioning the virtual location of the at least one audio source dependent on the at least one localised audio source.

The means for repositioning the virtual location of the at least one of the audio source may comprise: means for determining a spectra of the at least one localised audio source is similar to a spectra of the at least one audio source; and means for repositioning the virtual location of the at least one audio source further away from the at least one localised audio source.

The means for repositioning the virtual location of the at least one audio source further away from the at least one localised audio source may comprise means for repositioning the virtual location of the at least one audio source to the opposite direction of a direction of the at least one localised audio source.

The means for analysing the first audio source may determine at least two audio sources and the means for analysing the second audio signal may determine at least two localised audio sources, wherein the means for repositioning the virtual location of at least one of the at least two audio source may comprise: means for pairing each audio source with a localised audio source; means for determining a spectral distance between each pair; means for sorting each pair in order of spectral distance; means for selecting pairs in the order sorted; and means for repositioning the virtual location of the audio source associated with the pair selected to one of: the opposite position to a position of the localised audio source associated with the pair; and a position closest to the opposite position to a position of the localised audio source where the opposite position to a position of the localised audio source is occupied by a further audio source or localised audio source.

The means for repositioning the virtual location of at least one of the at least two audio source may be configured to repeat: pairing each audio source with a localised audio source; determining a spectral distance between each pair; sorting each pair in order of spectral distance; selecting pairs in the order sorted; and repositioning the virtual location of the audio source associated with the pair selected to one of: the opposite position to a position of the localised audio source associated with the pair; and a position closest to the opposite position to a position of the localised audio source where the opposite position to a position of the localised audio source is occupied by a further audio source or localised audio source, until no further significant improvement is possible.

The means for repositioning the virtual location of the at least one of the audio source may comprise: means for determining a direction difference between the at least one localised audio source and the virtual location of the at least one audio source is less than a determined value; and means for repositioning the virtual location of the at least one audio source further away from the at least one localised audio source.

The means for repositioning the virtual location of the at least one of the audio source may comprise: means for determining the at least one audio source is a speech audio source; and means for repositioning the virtual location of the speech audio source further away from the at least one localised audio source.

The means for repositioning the virtual location of the at least one of the audio source may comprise: means for determining the at least one audio source is a low energy audio source; and means for repositioning the virtual location of the low energy audio source further away from the at least one localised audio source.

The apparatus may further comprise means for receiving an indication identifying the at least one audio source, and the means for repositioning the virtual location of the at least one audio source dependent on the at least one localised audio source may comprise means for repositioning the virtual location of the at least one of the audio source identified further away from the at least one localised audio source.

The first audio signal may be at least one of: a received audio signal via a receiver; and a retrieved audio signal via a memory.

The means for analysing a first audio signal to determine at least one audio source may comprise: means for dividing the first audio signal into a first number of frequency bands; means for determining for the first number of frequency bands a second number of dominant audio directions; means for ordering the second number of dominant audio directions; means for determining a third number of audio sources to be found; and means for selecting the ordered third number of dominant audio directions as the virtual location audio source directions.

The means for analysing a second audio signal to determine at least one localised audio source, wherein the second audio signal is generated from the apparatus audio environment may comprise: means for dividing the second audio signal into a first number of frequency bands; means for determining for the first number of frequency bands a second number of dominant audio directions; and means for selecting the dominant audio directions where their associated audio components are greater than a determined noise threshold value as the localised audio source directions.

The apparatus may further comprise means for receiving the second audio signal from at least two microphones, wherein the microphones are located on or neighbouring the apparatus.

The apparatus may further comprise means for receiving at least one user input associated with at least one audio source, wherein the means for repositioning the virtual location of the at least one audio source further may comprise means for repositioning the virtual location of the at least one audio source dependent on the at least one user input associated with the at least one audio source.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of effective audio signal alignment when experiencing local noise. In the following examples, audio signals and audio capture signals are described. However it would be appreciated that in some embodiments the audio signal/audio capture is a part of an audio-video system.

The concept of embodiments of the application is to provide intelligibility and quality improvement of the spatial audio when listened in noisy audio environments.

Figure 1:
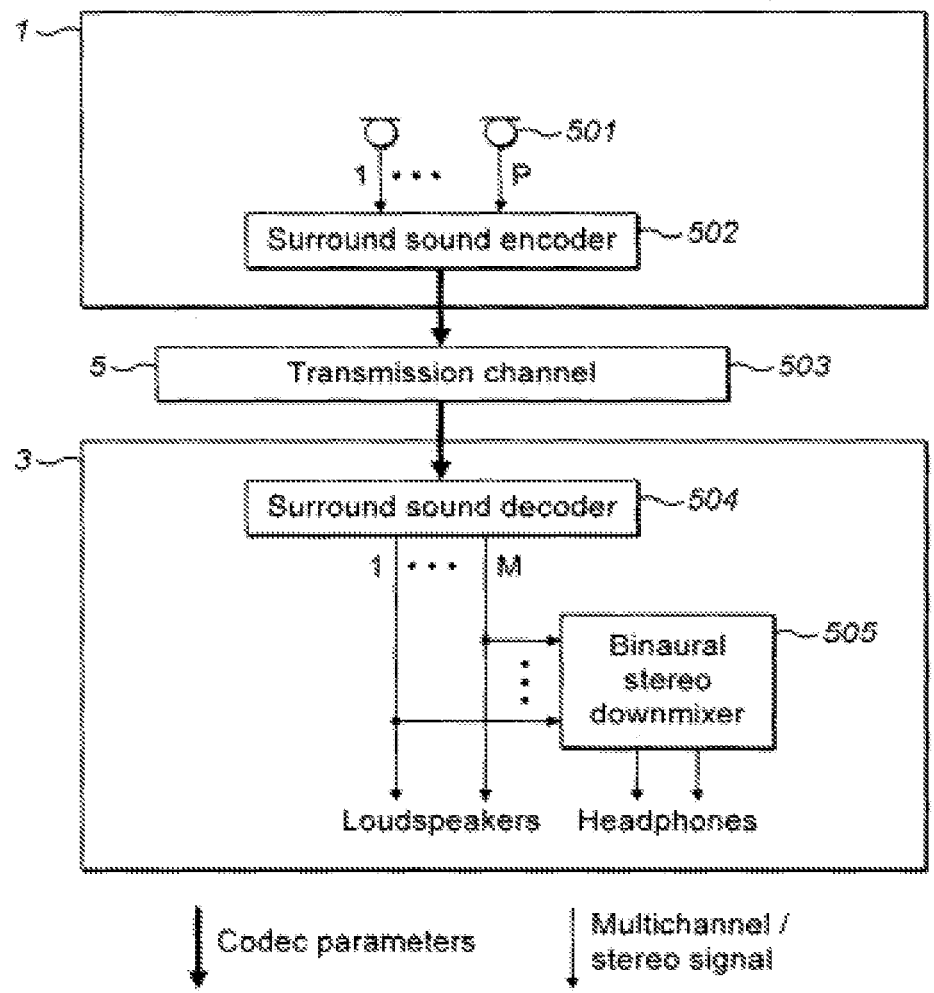
FIG. 1 shows an example of a typical telephony system utilising spatial audio coding.

An example of the typical telephony spatial audio coding system is shown in FIG. 1 in order to illustrate the problems associated with conventional spatial telephony. A first apparatus 1 comprises a set of microphones 501. In the example shown in FIG. 1 there are P microphones which pass generated audio signals to a surround sound encoder.

The first apparatus 1 further comprises a surround sound encoder 502. The surround sound encoder 502 is configured to encode the P generated audio signals in a suitable manner to be passed over the transmission channel 503.

The surround sound encoder 502 can be configured to incorporate a transmitter suitable for transmitting over the transmission channel.

The system further comprises a transmission channel 503 over which the encoded surround sound audio signals are passed. The transmission channel passes the surround sound audio signals to a second apparatus 3.

The second apparatus is configured to receive codec parameters and decode these using a suitable decoder and transfer matrix. The surround sound decoder 504 can in some embodiments be configured to output a number of multichannel audio signals to M loudspeakers. In the example shown in FIG. 1 there are M outputs from the surround sound decoder 504 passed to M loudspeakers to create a surround sound representation of the audio signal generated by the P microphones of the first apparatus.

In some embodiments the second apparatus 3 further comprises a binaural stereo downmixer 505. The binaural stereo downmixer 505 can be configured to receive the multi-channel output (for example M channels) and downmix the multichannel representation into a binaural representation of spatial sound which can be output to headphones (or headsets or earpieces).

It would be understood that any suitable surround sound codec or other spatial audio codec can be used by the surround sound encoder/decoder. For example surround sound codecs include Moving Picture Experts Group (MPEG) surround and parametric object based MPEG spatial audio object coding (SAOC).

The example shown in FIG. 1 is a simplified block diagram of a typical telephony system and therefore for simplification purposes does not discuss transmission encoding or similar. Furthermore it would be understood that the example shown in FIG. 1 shows one way communication but the first and second apparatus could comprise the other apparatus parts to enable two way communication.

Figure 2:
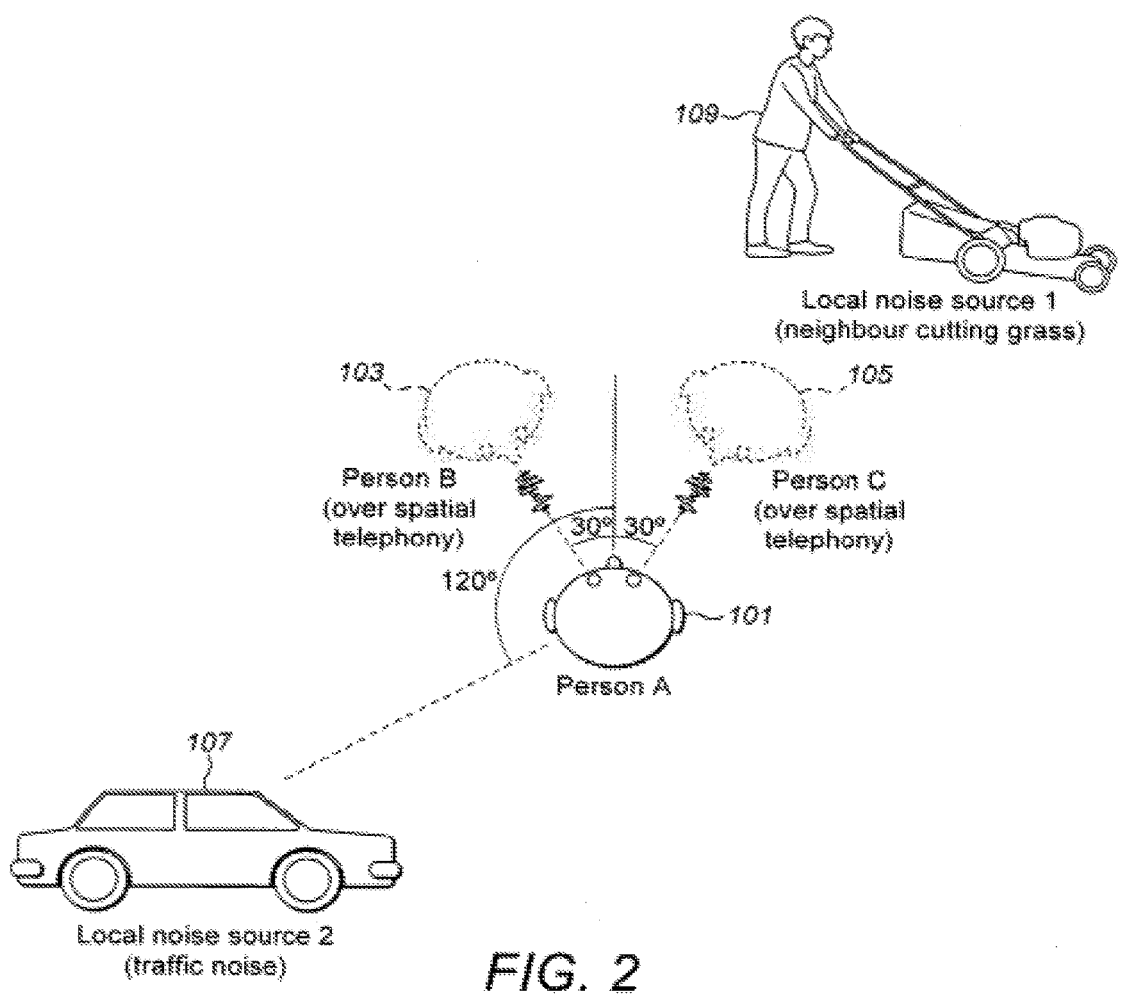
FIG. 2 shows an illustration of a conference call using the system shown in FIG. 1.

An example problem which can occur using the system shown in FIG. 1 is shown in FIG. 2 where person A 101 is attempting a teleconference with person B 103 and person C 105 over spatial telephony. The spatial sound encoding can be performed such that for the person A 101 the surround sound decoder 504 is configured to position person B 103 approximately 30 degrees to the left of the front (mid line) of person A 101 and position person C approximately 30 degrees to the right of the front of person A 101. As shown in FIG. 2 the environmental noise for person A can be seen as traffic noise (local noise source 2 107) approximately 120 degrees to the left of person A and a neighbour cutting the grass using a lawn mower (local noise source 1 109) approximately 30 degrees to the right of person A.

The local noise source 1 would make it very difficult for person A 101 to hear what person C 105 is saying because both person C (from spatial sound decoding) and the noise source 1 in the local live audio environment surrounding the listener (person A 101) 109 are heard from approximately the same direction. It would be understood that although noise source 2 is a distraction it would have less or little impact on the ability of person A 101 to hear any of the participants since the direction is distinct from the voices of the participants of the conference call.

The concept of embodiments of the application is therefore to improve the quality of spatial audio through the use of spatial interaction with the local live audio environment. In other words there can be an improvement to the audio quality by repositioning the virtual location or positioning the spatial audio signal of telephony audio signals into empty or (emptier) spatial locations (or directions) with respect to the listener within the local live audio environment. In such embodiments the received spatial audio signal, in other words the voice from the far end can be repositioned so that it can be heard from a different direction than the local live environmental noise surrounding the listener. Therefore in these embodiments loud sounds and noises in the live audio environment will disturb the listening of spatial audio signals as little as possible whilst permitting the live audio signals to be audible.

Figure 6:
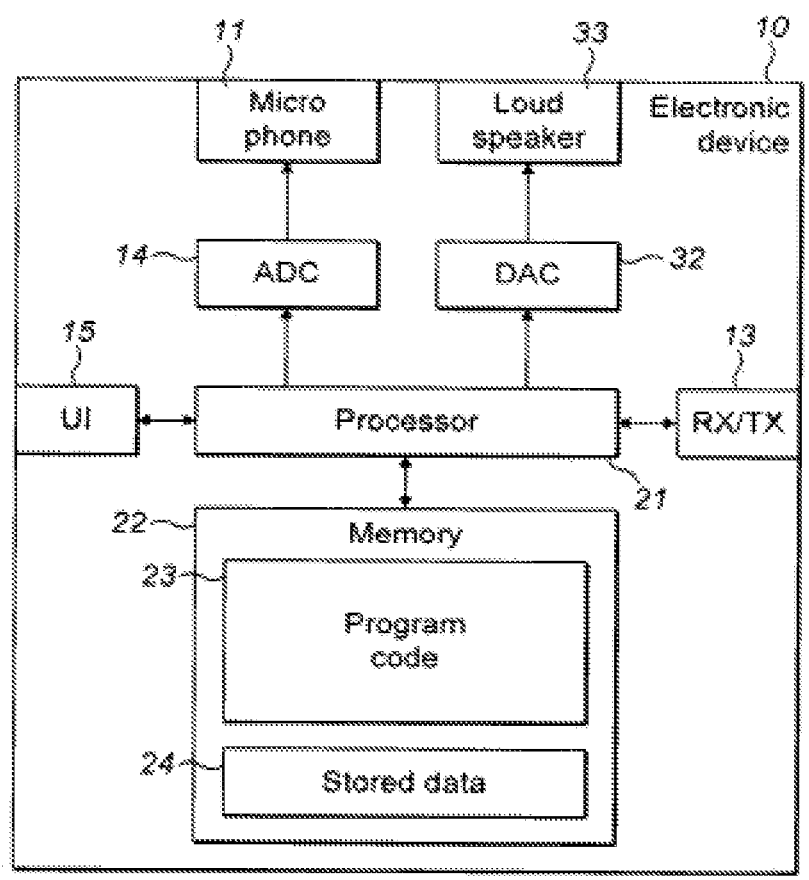
FIG. 6 shows schematically an apparatus suitable for being employed in embodiments of the application.

In this regard reference is first made to FIG. 6 which shows a schematic block diagram of an exemplary apparatus or electronic device 10, which may be used to operate as the first 201 (encoder) or second 203 (decoder) apparatus in some embodiments.

The electronic device or apparatus 10 may for example be a mobile terminal or user equipment of a wireless communication system when functioning as the spatial encoder or decoder apparatus. In some embodiments the apparatus can be an audio player or audio recorder, such as an MP3 player, a media recorder/player (also known as an MP4 player), or any suitable portable device suitable for recording audio or audio/video camcorder/memory audio or video recorder.

The apparatus 10 can in some embodiments comprise an audio subsystem. The audio subsystem for example can comprise in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means.

In some embodiments the apparatus 10 audio subsystem further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio subsystem can comprise in some embodiments a speaker 33. The speaker 33 can in some embodiments receive the output from the digital-to-analogue converter 32 and present the analogue audio signal to the user. In some embodiments the speaker 33 can be representative of a headset, for example a set of headphones, or cordless headphones.

Although the apparatus 10 is shown having both audio capture and audio presentation components, it would be understood that in some embodiments the apparatus 10 can comprise one or the other of the audio capture and audio presentation parts of the audio subsystem such that in some embodiments of the apparatus the microphone (for audio capture) or the speaker (for audio presentation) are present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals. The processor 21 can be configured to execute various program codes. The implemented program codes can comprise for example surround sound decoding, detection and separation of audio objects, determination of audio object reposition of audio objects, clash or collision audio classification and audio source mapping code routines.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been processed or to be processed in accordance with the embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15.

In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The coupling can, as shown in FIG. 1, be the transmission channel 503. The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

It is to be understood again that the structure of the apparatus 10 could be supplemented and varied in many ways.

Figure 3:
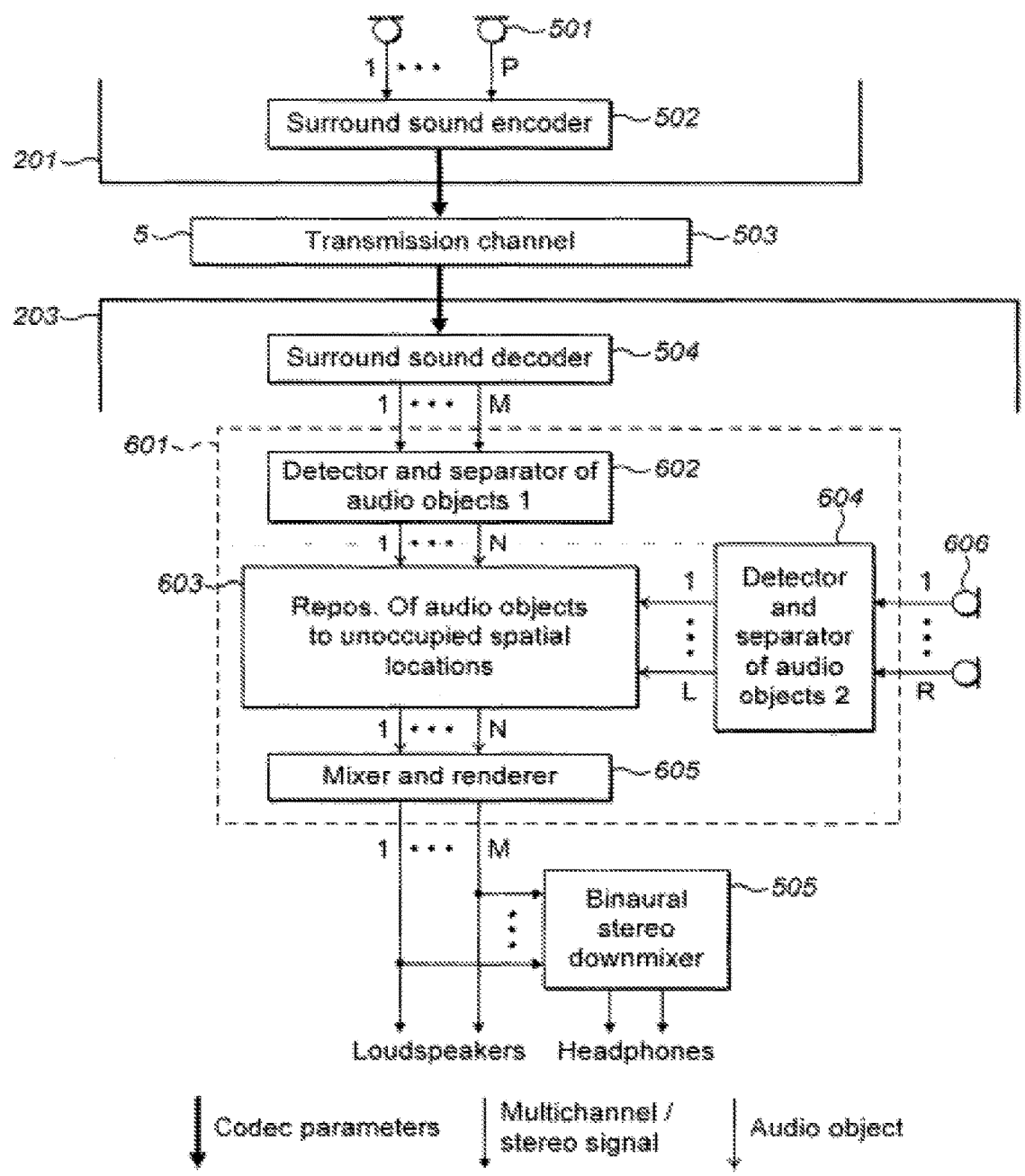
FIG. 3 shows schematically a system and apparatus for audio signal processing for audio spatialisation and source separation according to some embodiments.

With respect to FIG. 3 a block diagram of a simplified telephony system using spatial audio coding according to some embodiments of the application is shown. Furthermore with respect to FIG. 4 flow diagrams showing the operation of the apparatus shown in FIG. 3 is shown.

The first, encoding or transmitting apparatus 201 is shown in FIG. 3 to comprise components similar to the first apparatus 1 shown in FIG. 1 comprising a microphone array of P microphones 501 which generate audio signals which are passed to the surround sound encoder 502.

The surround sound encoder 502 receives the audio signals generated by the microphone array of P microphones 501 and encodes the audio signals in any suitable manner.

The encoded audio signals are then passed over the transmission channel 503 to the second, decoding or receiving apparatus 203.

The second, decoding or receiving apparatus 203 comprises a surround sound decoder 504 which in a manner similar to the surround sound decoder shown in FIG. 1 decodes the encoded surround sound audio signals and generates a multi-channel audio signal, which is shown in FIG. 3, as a M channel audio signal. The decoded multi-channel audio signal in some embodiments are passed to the audio spatialiser 601.

It is to be understood that the surround sound encoding and/or decoding blocks represent not only possible low-bitrate coding but also all necessary processing between different representations of the audio. This can include for example upmixing, downmixing, panning, adding or removing decorrelation etc.

The audio spatializer 601 may receive one multichannel audio representation from the surround sound decoder 504 and after the audio spatialiser 601 there may also be other blocks that change the representation of the multichannel audio. For example there can be implemented in some embodiments a 5.1 channel to 7.1 channel converter, or a B-format encoding to 5.1 channel converter. In the example embodiment described herein the surround decoder outputs the mid signal, the side signal and the angles alpha. The object separation is then performed on these signals. After the audio spatialiser 601 in some embodiments there is a separate rendering block converting the signal to a suitable multichannel audio format, such as 5.1 channel format, 7.1 channel format or binaural format.

In some embodiments the receiving apparatus 203 further comprises an array of microphones 606. The array of microphones 606, which in the example shown in FIG. 3 comprises R microphones, can be configured to generate audio signals which are passed to the audio spatialiser 601.

In some embodiments the receiving apparatus 203 comprises an audio spatialiser 601. The audio spatialiser 601 is configured to receive the decoded surround sound audio signals, which for example in FIG. 3 shows a M channel audio signal input to the audio spatialiser 601 and further receive the local environmental generated audio signals from the receiving apparatus 203 microphone array 606 (R microphones). The audio spatialiser is configured to determine and separate audio sources or objects from these received audio signals, determine whether there is any spatial shadowing or spatial clash or overlap of the decoded surround audio sound input by any environmental noise audio signals and reposition the surround sound audio signal objects to empty or emptier spatial positions so to improve the intelligibility and quality of the surround sound audio signals.

In some embodiments the audio spatialiser 601 comprises a first audio signal analyser which is configured to analyse a first audio signal to determine or detect and separate audio objects or sources. The audio signal analyser or detector and separator shown in the figures as detector and separator of audio objects 1, 602. The first detector and separator 602 is configured to receive the audio signals from the surround sound decoder 504 and generate parametric audio object representations from the multi-channel signal. It would be understood that the first detector and separator 602 output can be configured to output any suitable parametric representation of the audio. For example in some embodiments the first detector and separator 602 can for example be configured to determine sound sources and generate parameters describing for example the direction of each sound source, the distance of each sound source from the listener, the loudness of each sound source. In some embodiments the first detector and separator of audio objects 602 can be bypassed or be optional where surround sound decoder generates audio object representation of the spatial audio signals. In some embodiments the surround sound decoder 504 can be configured to output metadata indicating the parameters describing sound sources within the decoded audio signals such as the direction of sound sources, the distance and loudness then the audio object parameters can be passed directly to a repositioner 603.

Similarly in some embodiments the surround sound decoder can be configured to output metadata indicating whether or not the surround sound audio signal comprises telephony information. In some embodiments the metadata generated by the decoder can furthermore in some embodiment indicate where the audio signal sources are non-speech or non-telephony audio signals. For examples the metadata can indicate the received audio signals are streaming, broadcast, multi-cast or downloading audio signals and in such embodiments be configured to bypass the first detector and separator. In other words where the audio signal is not required to be checked for shadowing by local environmental noise audio signals.

In some embodiments the detector and separator of audio objects 602 may detect the audio object type. For example the audio object can be designated a type such as speech, or car and pass this information to the repositioner 603. In such embodiments the repositioner may then decide not to reposition some of the objects based on their type. Similarly, in some embodiments the surround sound decoder 504 can read metadata information (if available) on the object types from the encoded audio signal and pass this directly to the repositioner 603.

Figure 4:
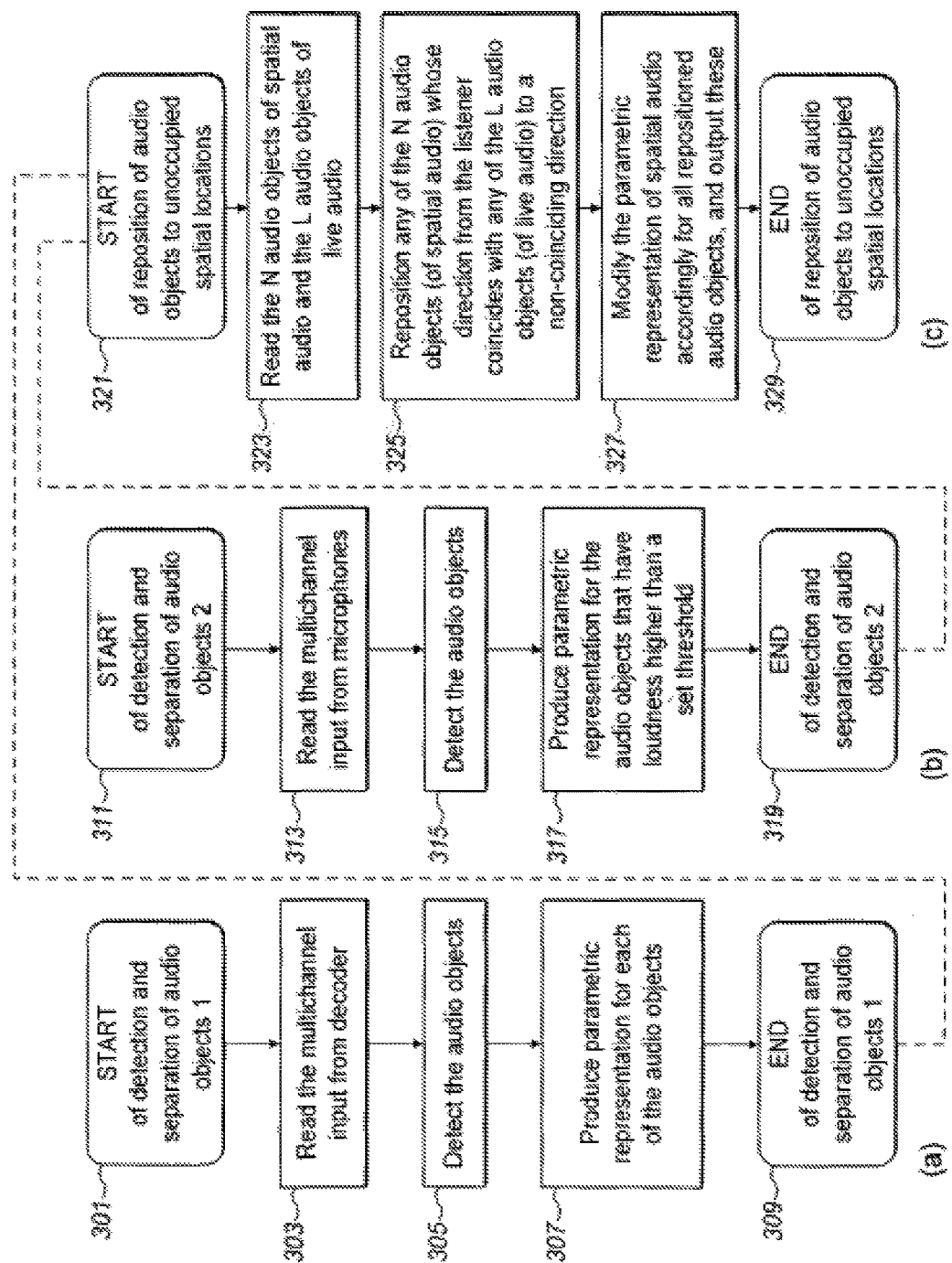
FIG. 4 shows a flow diagram of the operation of the audio signal processor as shown in FIG. 3 according to some embodiments.

With respect to FIG. 4 the operation of starting the detection and separation of audio objects from the surround sound decoder is shown in step 301.

Furthermore the operation of reading the multi-channel input from the sound decoder is shown in step 303.

In some embodiments the first detector and separator can determine audio sources from the spatial signal using any suitable means.

The operation of detecting audio objects within the surround sound decoder is shown in FIG. 4 by step 305.

The first detector and separator can in some embodiments then analyse the determined audio objects and determine parametric representations of the determined audio objects.

Furthermore the operation of producing parametric representations for each of the audio objects from the surround sound decoded audio signals is shown in FIG. 4 by step 307.

The first detector and separator can in some embodiments output these parameters to the repositioner.

The generation an outputting of the parametric representation for each of the audio objects and the ending of the detection and separation of the audio objects from the surround sound decoder is shown in FIG. 4 by step 309.

In some embodiments the audio spatialiser 601 comprises a second audio signal analyser which is configured to analyse a second audio signal to determine or detect and separate audio objects or sources. The second audio signal analyser or detector and separator is shown in the figures as the detector and separator of audio objects 2 604. The second detector and separator 604, in some embodiments, is configured to receive the output of the microphone array 606 and generate parametric representations for the determined audio objects in a manner similar to the first detector and separator. In other words the second detector and separator can be considered to analyse the local or environmental audio scene to determine any localised audio sources or audio objects with respect to the listener or user of the apparatus.

The starting of the operation of detecting and separating of audio objects from the microphone array is shown in FIG. 4 by step 311.

The operation of reading the multi-channel input from the microphones 606 is shown in FIG. 4 by step 313.

The second detector and separator 604 can in some embodiments determine or detect audio objects from the multi-channel input from the microphones.

The detection of audio objects is shown in FIG. 4 by step 315.

The second detector and separator 604 can in some embodiments further be configured to perform a loudness threshold check on each of the detected audio objects to determine whether any of the objects have a loudness higher than a determined threshold value. Where the audio object detected has a loudness higher than a set threshold then the second detector and separator of audio objects 604 can be configured to generate a parametric representation for the audio object or source.

In some embodiments the threshold can be user controlled so that a sensitivity can be suitably adjusted for the local noise. In some embodiments the threshold can be used to automatically launch or trigger the repositioning of the virtual location of audio objects. In other words the second detector and separator 604 can in some embodiments be configured to control the operation of the repositioner such that where there are no "local" or "live" audio objects then no repositioning of virtual locations is required and the parameters from the surround sound decoder can be passed to the mixer and renderer with no repositioning operations.

The operation of producing a parametric representation for the audio object having a loudness higher than a set threshold is shown in FIG. 4 by step 317.

The second detector and separator 604 can furthermore in some embodiments be configured to output the parametric representations for the detected audio objects having a loudness higher than the threshold to the repositioner 603.

The operation of ending the detection and separation of audio objects from the microphone array is shown in FIG. 4 by step 319.

In some embodiments the spatialiser 601 comprises a repositioner 603. The repositioner 603 is configured to receive parametric representations of the determined or received audio objects (or sources) from the surround sound decoder and furthermore parametric representations for each audio object or source from the microphone array representing environmental noise which has a loudness higher than a determined threshold. The repositioner 603 is configured to determine where or whether any of the audio objects or sources from the surround sound decoder are in a shadow of the environmental noise source or audio object and reposition the audio object or sources from the sound decoder accordingly.

The repositioner 603 can therefore be configured to start the operation on receiving parametric values. As described herein the operation of the repositioner 603 can in some embodiments be dependent on determining an environmental noise object with a sufficiently loud volume.

The operation of starting the repositioning virtual locations of audio objects to unoccupied spatial locations is shown in FIG. 4 by step 321.

The reading or receiving of the audio objects from the surround sound decoder input, the remote spatial audio and the audio objects of the live audio is shown in FIG. 4 by step 323.

The repositioner can in some embodiments therefore reposition any of the surround sound audio objects whose virtual location or direction from the listener coincides or is in shadow with any of the audio objects from the live audio to a position where there are no coinciding or shadow region live audio objects.

The operation of repositioning the virtual location of any of the audio objects is shown in FIG. 4 by step 325.

The repositioner can then modify the parametric representation of any spatial audio objects which have been repositioned and output these values to a mixer and renderer 605.

The operation of modifying the parametric representation of spatial audio according to reposition audio object is shown in FIG. 4 by step 327.

The output of the repositioned values is shown in FIG. 4 by step 329.

In some embodiments the spatialiser 601 comprises a mixer and renderer 605 configured to mix and render the decoded sound audio objects according to the original and any repositioned audio object parametric representations. Furthermore in some embodiments, for example where the user is listening via noise isolating headphones, the mixer and renderer 605 can be configured to mix and render at least some of the live or microphone audio object audio signals so to allow the user to hear if there are any emergency or other situations in the local environment.

The mixer and renderer can then output the M multi-channel signals to the loudspeakers or the binaural stereo downmixer 505.

Figure 5:
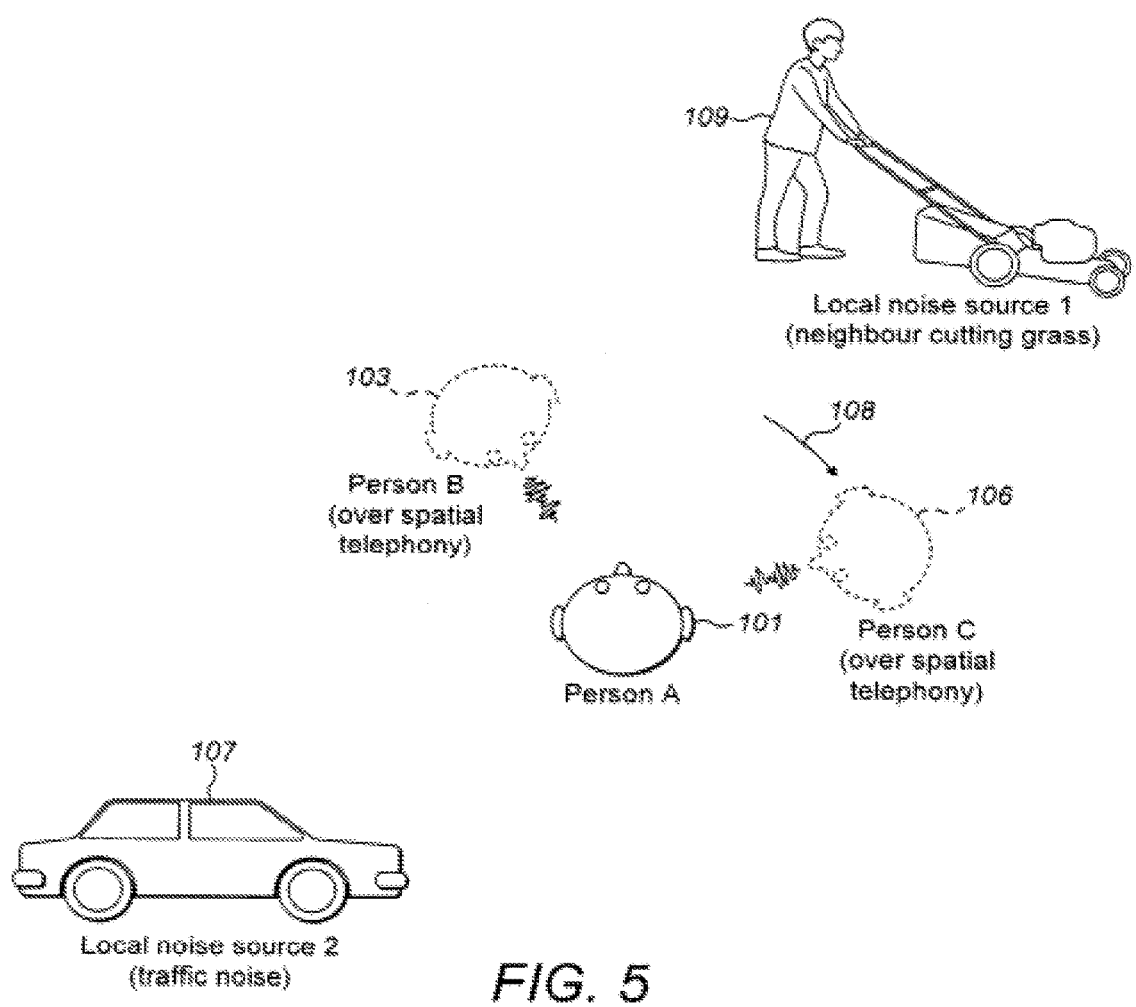
FIG. 5 shows an example of a conference call using the apparatus shown in FIGS. 3 and 4.

An example of the repositioning virtual locations of audio objects due to live or local noise is shown in FIG. 5 where for example person A 101 is listening to the teleconference outputs from person B 103 and person C 105 and the repositioner moves the audio object of person C 105 spatial sound away from the local noise source 1 109 such that the movement 108 of the audio object moves the person C surround sound audio object to approximately 70 degrees to the right of person A so that person C 106 audio object, having being moved, is more intelligible than before.

Figure 7:
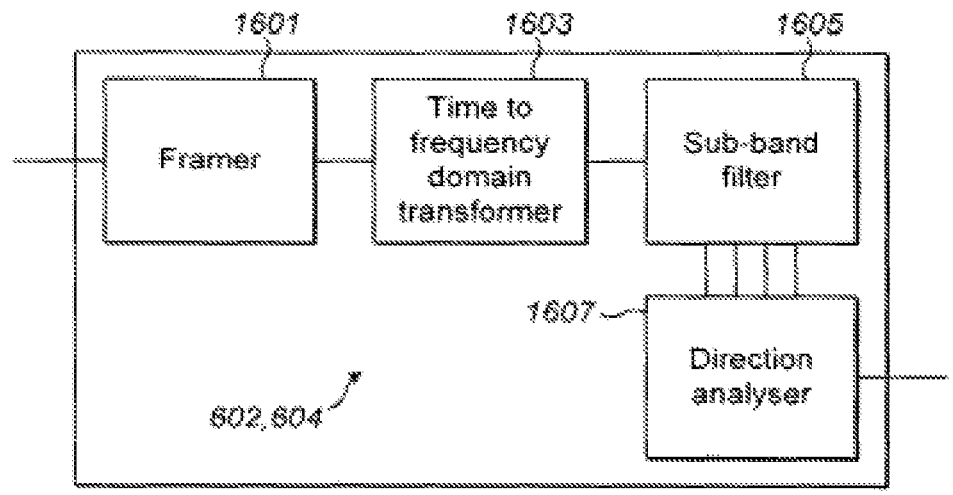
FIGS. 7, 8 and 9 show schematically the apparatus as shown in FIG. 3 in further detail according to some embodiments.

With respect to FIG. 7 an example implementation of the object detector and separator, such as the first and the second object detector and separator according to some embodiments is shown. Furthermore with respect to FIG. 10 the operation of the example object detector and separator as shown in FIG. 7 is described.

In some embodiments the object detector and separator comprises a framer 1601. The framer 1601 or suitable framer means can be configured to receive the audio signals from the microphones/decoder and divide the digital format signals into frames or groups of audio sample data. In some embodiments the framer 1601 can furthermore be configured to window the data using any suitable windowing function. The framer 1601 can be configured to generate frames of audio signal data for each microphone input wherein the length of each frame and a degree of overlap of each frame can be any suitable value. For example in some embodiments each audio frame is 20 milliseconds long and has an overlap of 10 milliseconds between frames. The framer 1601 can be configured to output the frame audio data to a Time-to-Frequency Domain Transformer 1603.

Figure 10:
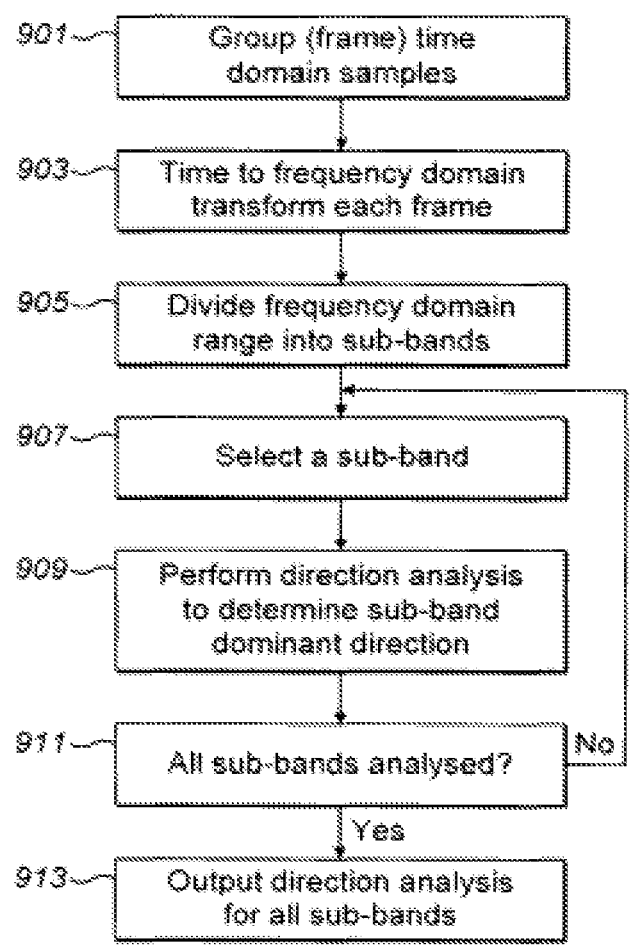
FIGS. 10, 11 and 12 show flow diagrams of the operation of the apparatus as shown in FIGS. 7, 8 and 9 according to some embodiments.

The operation of grouping or framing time domain samples is shown in FIG. 10 by step 901.

In some embodiments the object detector and separator is configured to comprise a Time-to-Frequency Domain Transformer 1603. The Time-to-Frequency Domain Transformer 1603 or suitable transformer means can be configured to perform any suitable time-to-frequency domain transformation on the frame audio data. In some embodiments the Time-to-Frequency Domain Transformer can be a Discrete Fourier Transformer (DFT). However the Transformer can be any suitable Transformer such as a Discrete Cosine Transformer (DCT), a Modified Discrete Cosine Transformer (MDCT), a Fast Fourier Transformer (FFT) or a quadrature mirror filter (QMF). The Time-to-Frequency Domain Transformer 1603 can be configured to output a frequency domain signal for each microphone input to a sub-band filter 1605.

The operation of transforming each signal from the microphones into a frequency domain, which can include framing the audio data, is shown in FIG. 10 by step 903.

In some embodiments the object detector and separator comprises a sub-band filter 1605. The sub-band filter 1605 or suitable means can be configured to receive the frequency domain signals from the Time-to-Frequency Domain Transformer 1603 for each microphone and divide each microphone audio signal frequency domain signal into a number of sub-bands.

The sub-band division can be any suitable sub-band division. For example in some embodiments the sub-band filter 1605 can be configured to operate using psychoacoustic filtering bands. The sub-band filter 1605 can then be configured to output each domain range sub-band to a direction analyser 1607.

The operation of dividing the frequency domain range into a number of sub-bands for each audio signal is shown in FIG. 10 by step 905.

In some embodiments the object detector and separator can comprise a direction analyser 1607. The direction analyser 1607 or suitable means can in some embodiments be configured to select a sub-band and the associated frequency domain signals for each microphone of the sub-band.

The operation of selecting a sub-band is shown in FIG. 10 by step 907.

The direction analyser 1607 can then be configured to perform directional analysis on the signals in the sub-band. The directional analyser 1607 can be configured in some embodiments to perform a cross correlation between the microphone/decoder sub-band frequency domain signals within a suitable processing means.

In the direction analyser 1607 the delay value of the cross correlation is found which maximises the cross correlation of the frequency domain sub-band signals. This delay can in some embodiments be used to estimate the angle or represent the angle from the dominant audio signal source for the sub-band. This angle can be defined as a. It would be understood that whilst a pair or two microphones/decoder channels can provide a first angle, an improved directional estimate can be produced by using more than two microphones/decoder channels and preferably in some embodiments more than two microphones/decoder channels on two or more axes.

The operation of performing a directional analysis on the signals in the sub-band is shown in FIG. 10 by step 909.

The directional analyser 1607 can then be configured to determine whether or not all of the sub-bands have been selected.

The operation of determining whether all the sub-bands have been selected is shown in FIG. 10 by step 911.

Where all of the sub-bands have been selected in some embodiments then the direction analyser 1607 can be configured to output the directional analysis results.

The operation of outputting the directional analysis results is shown in FIG. 10 by step 913.

Where not all of the sub-bands have been selected then the operation can be passed back to selecting a further sub-band processing step.

The above describes a direction analyser performing an analysis using frequency domain correlation values. However it would be understood that the object detector and separator can perform directional analysis using any suitable method. For example in some embodiments the object detector and separator can be configured to output specific azimuth-elevation values rather than maximum correlation delay values. Furthermore in some embodiments the spatial analysis can be performed in the time domain.

In some embodiments this direction analysis can therefore be defined as receiving the audio sub-band data;

$$X_k^b(n) = X_k(n_b+n), n=0, \ldots, n_{b+1}-n_b-1, b=0, \ldots, B-1$$

where $n_b$ is the first index of bth subband. In some embodiments for every subband the directional analysis as described herein as follows. First the direction is estimated with two channels. The direction analyser finds delay $\tau_b$ that maximizes the correlation between the two channels for subband b. DFT domain representation of e.g. $X_k^b(n)$ can be shifted $\tau_b$ time domain samples using $$X_{k,\tau_b}^b(n) = X_k^b(n)e^{-j\frac{2\pi n \tau_b}{N}}.$$

The optimal delay in some embodiments can be obtained from $$\max_{\tau_b} \text{Re}\left(\sum_{n=0}^{n_{b+1}-n_b-1} \left(X_{2,\tau_b}^b(n) * X_3^b(n)\right)\right), \tau_b \in [-D_{tot}, D_{tot}]$$

where Re indicates the real part of the result and * denotes complex conjugate. $X_{2,\tau_b}^b$ and $X_3^b$ are considered vectors with length of $n_{b+1}-n_b$ samples. The direction analyser can in some embodiments implement a resolution of one time domain sample for the search of the delay.

In some embodiments the object detector and separator can be configured to generate a sum signal. The sum signal can be mathematically defined as.

$$X_{sum}^b = \begin{cases} (X_{2,\tau_b}^b + X_3^b)/2 & \tau_b \leq 0 \\ (X_2^b + X_{3,-\tau_b}^b)/2 & \tau_b > 0 \end{cases}$$

In other words the object detector and separator is configured to generate a sum signal where the content of the channel in which an event occurs first is added with no modification, whereas the channel in which the event occurs later is shifted to obtain best match to the first channel.

It would be understood that the delay or shift $\tau_b$ indicates how much closer the sound source is to one microphone (or channel) than another microphone (or channel). The direction analyser can be configured to determine actual difference in distance as $$\Delta_{23} = \frac{v\tau_b}{F_s}$$

where Fs is the sampling rate of the signal and v is the speed of the signal in air (or in water if we are making underwater recordings).

The angle of the arriving sound is determined by the direction analyser as, $$\dot{\alpha}_b = \pm\cos^{-1}\left(\frac{\Delta_{23}^2 + 2b\Delta_{23} - d^2}{2db}\right)$$

where d is the distance between the pair of microphones/channel separation and b is the estimated distance between sound sources and nearest microphone. In some embodiments the direction analyser can be configured to set the value of b to a fixed value. For example b=2 meters has been found to provide stable results.

It would be understood that the determination described herein provides two alternatives for the direction of the arriving sound as the exact direction cannot be determined with only two microphones/channels.

In some embodiments the object detector and separator can be configured to use audio signals from a third channel or the third microphone to define which of the signs in the determination is correct. The distances between the third channel or microphone and the two estimated sound sources are:

$$\delta_b^+ = \sqrt{(h+b\sin(\dot{\alpha}_b))^2 + (d/2 + b\cos(\dot{\alpha}_b))^2}$$

$$\delta_b^- = \sqrt{(h-b\sin(\dot{\alpha}_b))^2 + (d/2 + b\cos(\dot{\alpha}_b))^2}$$

where h is the height of an equilateral triangle (where the channels or microphones determine a triangle), i.e.

$$h = \frac{\sqrt{3}}{2}d.$$

The distances in the above determination can be considered to be equal to delays (in samples) of;

$$\tau_b^+ = \frac{\delta^+ - b}{v}F_s$$

$$\tau_b^- = \frac{\delta^- - b}{v}F_s$$

Out of these two delays the object detector and separator in some embodiments is configured to select the one which provides better correlation with the sum signal. The correlations can for example be represented as $$c_b^+ = \text{Re}\left(\sum_{n=0}^{n_{b+1}-n_b-1} \left(X_{sum,\tau_b^+}^b(n) * X_1^b(n)\right)\right)$$

$$c_b^- = \text{Re}\left(\sum_{n=0}^{n_{b+1}-n_b-1} \left(X_{sum,\tau_b^-}^b(n) * X_1^b(n)\right)\right)$$

The object detector and separator can then in some embodiments then determine the direction of the dominant sound source for subband b as:

$$\alpha_b = \begin{cases} \dot{\alpha}_b & c_b^+ \geq c_b^- \\ -\dot{\alpha}_b & c_b^+ < c_b^- \end{cases}.$$

In some embodiments the object detector and separator further comprises a mid/side signal generator. The main content in the mid signal is the dominant sound source found from the directional analysis. Similarly the side signal contains the other parts or ambient audio from the generated audio signals. In some embodiments the mid/side signal generator can determine the mid M and side S signals for the sub-band according to the following equations:

$$M^b = \begin{cases} (X_{2,\tau_b}^b + X_3^b)/2 & \tau_b \leq 0 \\ (X_2^b + X_{3,-\tau_b}^b)/2 & \tau_b > 0 \end{cases}$$

$$S^b = \begin{cases} (X_{2,\tau_b}^b - X_3^b)/2 & \tau_b \leq 0 \\ (X_2^b - X_{3,-\tau_b}^b)/2 & \tau_b > 0 \end{cases}$$

It is noted that the mid signal M is the same signal that was already determined previously and in some embodiments the mid signal can be obtained as part of the direction analysis. The mid and side signals can be constructed in a perceptually safe manner such that the signal in which an event occurs first is not shifted in the delay alignment. The mid and side signals can be determined in such a manner in some embodiments is suitable where the microphones are relatively close to each other. Where the distance between the microphones is significant in relation to the distance to the sound source then the mid/side signal generator can be configured to perform a modified mid and side signal determination where the channel is always modified to provide a best match with the main channel.

The repositioner 603 can in some embodiments determine whether a surround sound audio object or source is similar to or within the shadow of an audio object or source from the live or environment by determining spectral similarity. In some embodiments spatial audio objects or sources with energy at low frequencies can be positioned as far as way as possible from live audio sources with energy at low frequencies also.

Figure 8:
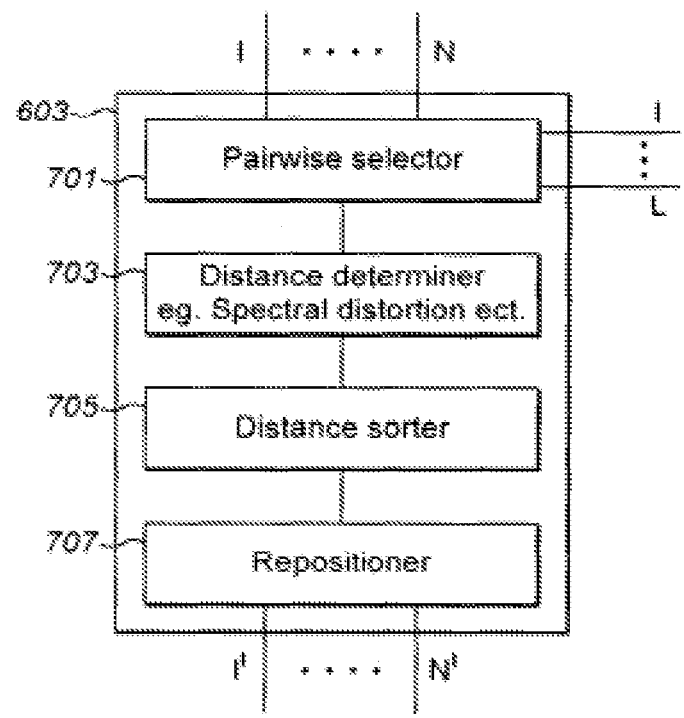

With respect to FIG. 8 a repositioner 603 configured to reposition the virtual location of the audio source or spatial audio object with respect to such embodiments is shown in further detail. Furthermore with respect to FIG. 11 the operation of the repositioner 603 as shown in FIG. 8 is described in further detail.

In some embodiments the repositioner 603 is configured to receive the object signals/parameters from the first detector and separator 602 and the second detector and separator 604. In other words to select a set of spatial audio objects and set of live audio objects.

Figure 11:
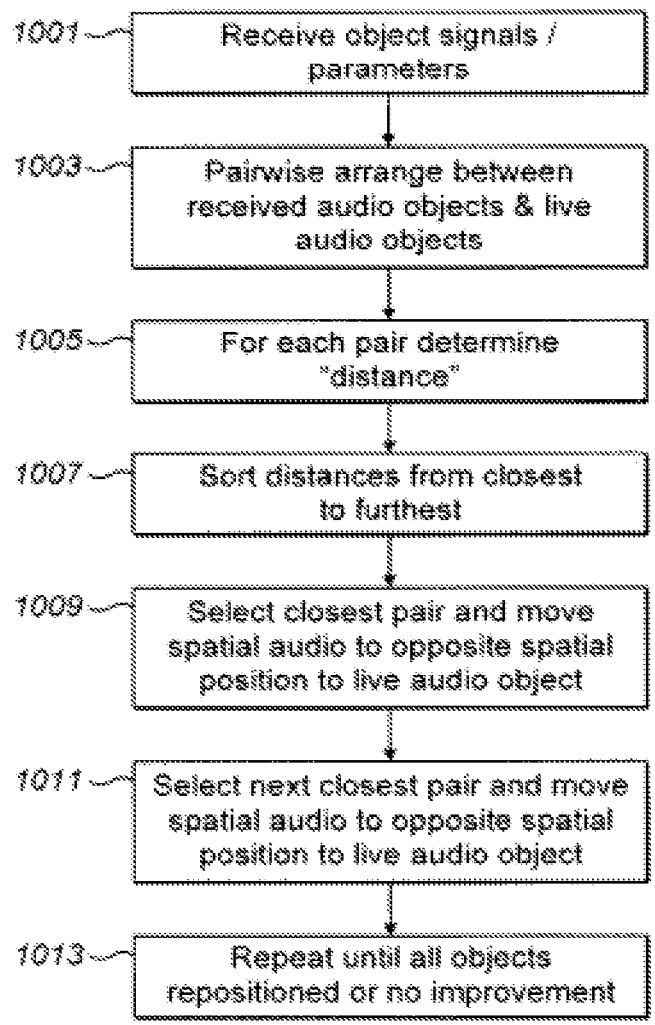

The operation of receiving the object signals/parameters is shown in FIG. 11 by step 1001.

In some embodiments the repositioner 603 comprises a pairwise selector 701. The pairwise selector is configured to pair up or determine pairings between the spatial audio objects and the live audio objects.

The operation of pairing between spatial (virtual location) audio objects and live (or localised) audio objects is shown in FIG. 11 by step 1003.

In some embodiments the repositioner 603 comprises a distance determiner 703. The distance determiner is configured to determine for at least one pairing the distance between the spatial audio object and the live audio object. The pairwise distance can be for example a distortion measure of average spectra of the sound objects. As an example, in some embodiments the log-spectral distance could be used, the log-spectral distance can be defined as $$D_{LS} = \sqrt{\frac{1}{2\pi}\int_{-\pi}^{\pi}\left[10\log_{10}\frac{P(\omega)}{S(\omega)}\right]^2 d\omega},$$

where $\omega$ is normalized frequency ranging from $-\pi$ to $\pi$ (with $\pi$ being one-half of the sampling frequency), and $P(\omega)$ and $S(\omega)$ the spectra of a live object and a spatial audio object, respectively. In some embodiments the spectral matching may be done by measuring the Euclidean distance between the mel-cepstrum of the live audio object and the candidate comfort object. In some embodiments the distance value can be determined based on a symmetrized Kullback-Leibler divergence between the Gaussians fitted to framewise mel-frequency cepstral coefficient features of the sound objects. In some embodiments the distance may be determined at least partly based on the ability of the live audio object to mask the spatial audio object based on any masking model used in conventional audio codecs, such as Advanced Audio Coding (AAC). That is, a small distance value may be assigned if the live audio object effectively masks the spatial audio object and correspondingly a large distance value may be assigned if the live audio object is not able to mask the spatial audio object. In some embodiments a similarity value may be used instead of a distance.

The operation of determining a 'distance' between the pair is shown in FIG. 11 by step 1005.

In some embodiments the repositioner 603 comprises a distance sorter 705 or orderer configured to order the pairs in terms of their distance from the smallest distance to the largest distance.

The operation of ordering or sorting the pairs dependent on the distance is shown in FIG. 11 by step 1007.

In some embodiments the repositioner comprises an ordered repositioner 707. The ordered repositioner 707 is configured to select the pair with the smallest distance and where the pair is one with a spatial audio object and a live object then move the spatial audio object to the opposite end of the spatial audio field compared to the live audio object in the pair. If there already exists a spatial audio object or a live audio object in the opposite end, some other suitable location where no audio objects yet exist may be chosen.

The operation of repositioning the virtual location of the spatial audio object of the pair with smallest distance is shown in FIG. 11 by step 1009.

In some embodiments the ordered repositioner 707 can be configured to repeat this operation until there is no improvement. Thus for example the ordered repositioner 707 could be configured to pick the pair with the second smallest of distance and reposition the spatial audio object as fair as possible from its live audio object pair.

The operation of repositioning the virtual location of the spatial audio object of the pair with the next smallest distance is shown in FIG. 11 by step 1011.

The operation of continuing repositioning the virtual location until all spatial audio objects have been repositioned or no improvement can be obtained through repositioning the virtual location is shown in FIG. 11 by step 1013. In one embodiment, the determination of no improvement for a spatial audio object is done when the distances to the spatially nearest live or spatial audio objects in the empty spatial locations are smaller or equal than the distance to the nearest live or spatial audio object in the current location. That is, there is no empty space in the spatial audio field which would not already contain an as similar sounding object nearby.

In some embodiments the repositioning the virtual location can take into account the direction and similarity where the spatial audio object is repositioned.

Figure 9:
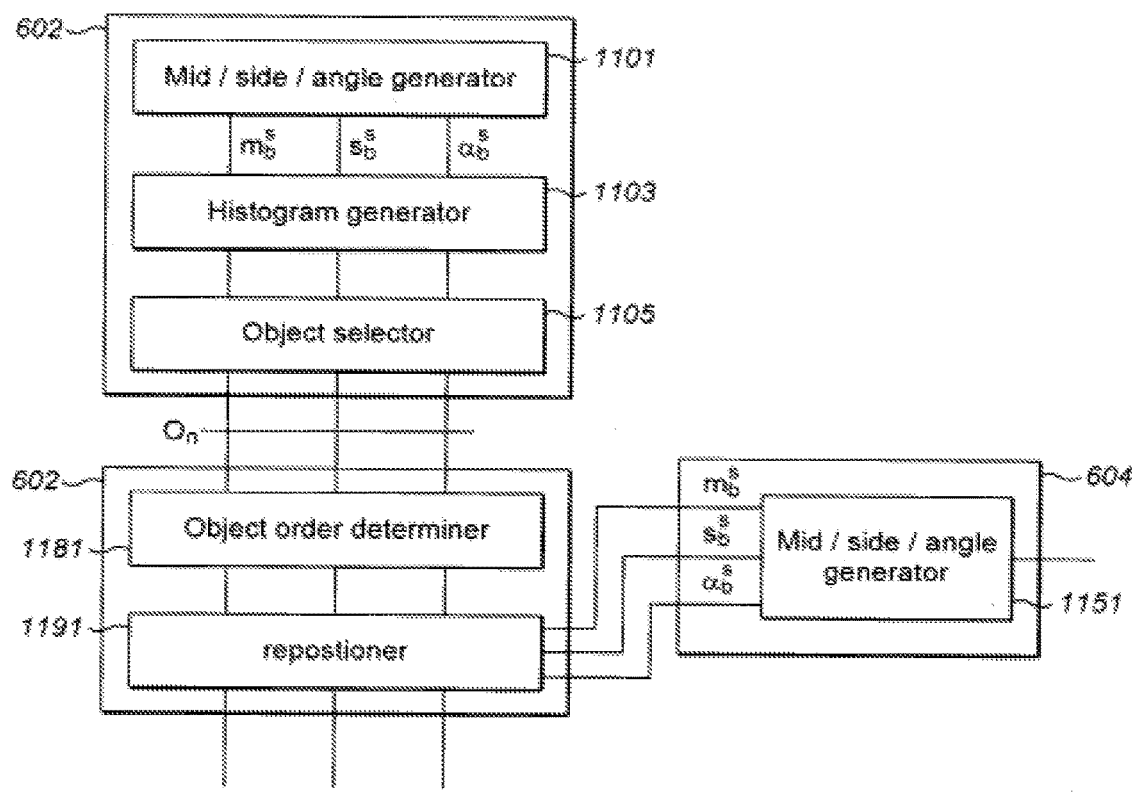

With respect to FIG. 9 a repositioner 603 configured to reposition the spatial audio objects with respect to such embodiments is shown in further detail. Furthermore with respect to FIG. 12 the operation of the repositioner 603 as shown in FIG. 9 is described in further detail.

FIG. 9 furthermore shows the first detector and separator 602 comprising a mid/side/angle generator 1001. The mid/side/angle generator 1001 can in some embodiments be configured to generate the mid and side channels and the angle determinations as described herein.

In some embodiments the output of the surround sound decoder 504 can be in the form of mid and side channels and directional angles $\alpha_b$ and first detector and separator 602 receiving this information.

As described herein the mid and side channels can be created by transforming short (time domain) frames to a frequency domain signal representation. Furthermore the mid, side and angle are determined for a number of frequency bands for each spatial sound source. In other words the mid, side and angles are represented by $$M_b^S, S_b^S \text{ and } \alpha_b^S, b=0, \ldots, B-1.$$

B is the number of frequency bands. Upper script S refers to the spatial sound that is played from headphones or speakers.

In some embodiments the first detector and separator of audio objects 602 can comprise a histogram generator configured to build a histogram for the angle $\alpha_b^S$ for each time frame of audio. In some embodiments the intervals in the histogram can be 20 degrees. The histogram can then in some embodiments be weighted for the sound level of $M_b^S$ in other words each angle $\alpha_b^s$ is counted to the histogram as many times as the level of $M_b^S$ is in dB.

In some embodiments the first detector and separator 602 can comprise an object selector 1105 configured to receive the output of the histogram generator 1103 and select or choose the N largest peaks in the histogram as the directions of the objects. For example the objects are represented by $\beta_n$, n=1, . . . , N. N refers to the number of objects. N can be a fixed value, and for a teleconferencing application N is typically 1 (as only one speaker typically speaks at a time). All the bands whose $\alpha_b^S$ does not significantly differ (e.g. 30 deg.) from $\beta_n$ are considered to belong to that object. Thus the objects are:

$$O_n = \{b \mid \|\alpha_b^S - \beta_n\| < \alpha_{diff}\}$$

where $$\alpha_{diff} = \min\left(30°, \frac{\beta_i - \beta_j}{2}\right),$$

i≠j. $\alpha_{diff}$ in some embodiments is limited, otherwise, one band could belong to several objects.

In these embodiments objects can be formed of bands of the mid signal. That is each object is made of one or more frequency bands of the mid signal. Frequency bands of the mid signal are defined as $M_b^S$.

In some embodiments the first detector and separator 604 similarly comprises a mid/side/angle generator configured to determine mid, side and angle parameters which can be represented by $M_b^L$, $S_b^L$ and $\alpha_b^L$.

In some embodiments the repositioner 603 can comprise an object order determiner 1181 configured to sort or order the objects dependent on a determined criteria. For example in some embodiments the repositioner 603 object order determiner 1181 can order the audio objects $O_n$ for repositioning the virtual location starting from the object which has least overall energy and therefore the most difficult to hear. In some embodiments the object order determiner 1181 can order the audio objects $O_n$ for repositioning the virtual location starting from perceptually most important objects. For example a speech recogniser and/or a voice activity detector (VAD) can be used to detect which of the objects are speech and then reposition these first. The other objects can then be repositioned taking into account the already repositioned audio objects in addition to the live auditory scene. In other words an order sorting can be performed on the audio objects to produce an order list $O_{n1}, O_{n2}, \ldots, O_{nN}$.

Figure 12:
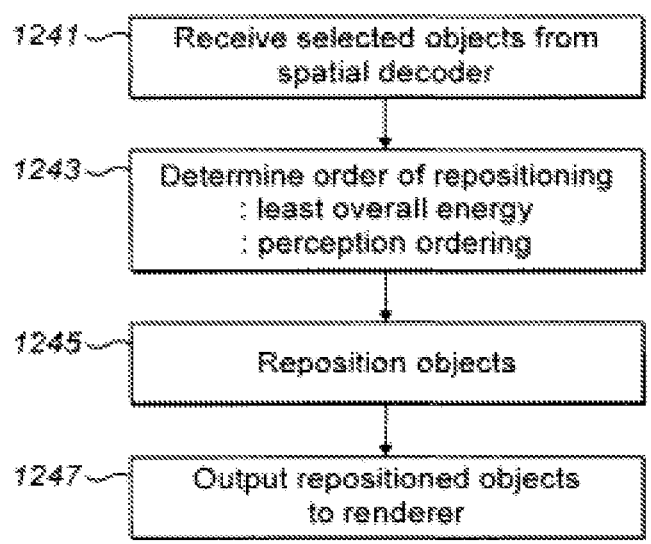

The operation of receiving the objects from the spatial decoder is shown in FIG. 12 by step 1241.

The operation of sorting or ordering the objects according to criteria is shown in FIG. 12 by step 1243.

The repositioner 603 can in some embodiments comprise an ordered repositioner 1191. The ordered repositioner 1191 can be configured to select the first object to be repositioned is $O_{n1}$.

In some embodiments the ordered repositioner 1191 can reposition the object to direction $\sqsupset_1$ where $\square_1$ is a spatially and spectrally empty direction for $O_{n1}$ and is calculated as follows $$\gamma_1 = \max_\gamma \sum_{b \in O_{n1}} \frac{\|\|M_b^S\| - \|M_b^L\|\|}{|\gamma - \alpha_b^L|}.$$

Subsequent objects in some embodiments can then be repositioned to directions which have not been used according to the following $$\gamma_k = \max_\gamma \sum_{b \in O_{nk}} \frac{\|\|M_b^S\| - \|M_b^L\|\|}{|\gamma - \alpha_b^L|},$$

$$|\gamma - \gamma_l| > \gamma_{min} \forall\, l = 1, \ldots, k-1, k = 2, \ldots, N,$$

where $\gamma_{min}$ is a determined spacing defining the closest that new objects can be positioned to already positioned objects. In some embodiments the value $\gamma_{min}$ depends on the total number of objects N. For example in some embodiments $\gamma_{min}$ is determined as:

$$\gamma_{min} = \frac{360°}{N * a}$$

where e.g. a=3.

The direction of the bands b of $M_b^S$ that do not belong to any object, remain unchanged.

The operation of repositioning the virtual location of the objects is shown in FIG. 12 by step 1245.

The operation of outputting the repositioned objects is shown in FIG. 12 in step 1247.

The repositioned signals can then be rendered in the mixer and renderer 605 according to any suitable repositioning method. However it would be understood that in some embodiments that in some embodiments that the following expression can be applied:

$$\alpha_b^S = \begin{cases} \gamma_k, & \text{if } b \in O_k \\ \alpha_b^S, & \text{else} \end{cases}$$

In some embodiments the repositioner 603 can be configured to receive a manual indication or input of where the played spatial audio sound source is to be repositioned. In such embodiments the repositioner 603 is configured to move one of the objects from the spatial decoder to the location indicated by the user. In some embodiments this indication can be provided by touching a desired direction on a user interface where the user is positioned at the centre and the top being in front and bottom being directly behind the user.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one non-transitory memory including computer code for one or more programs, the at least one non-transitory memory and the computer code configured to with the at least one processor cause the apparatus to at least:
   analyze a first audio signal to locate at least one first audio source, wherein the at least one first audio source has a virtual location with respect to a listener during reproduction of the first audio signal using the apparatus;
   determine whether the at least one first audio source corresponds to a predetermined type of audio source;
   analyze a second audio signal generated from an environment surrounding the apparatus to determine a direction of at least one second audio source with respect to at least one microphone of the apparatus;
   create a parametric audio representation for each of the at least one first audio source and the at least one second audio source; and
   using the parametric representation of the at least one first audio source and the at least one second audio source, virtually reposition the at least one first audio source away from the at least one second audio source based on the determination that the at least one first audio source corresponds to the predetermined type of audio source.

2. The apparatus as claimed in claim 1, wherein the predetermined type of audio source is speech.

3. The apparatus as claimed in claim 1, wherein virtually repositioning the at least one first audio source is based on an ordered list.

4. The apparatus as claimed in claim 1, wherein the at least one non-transitory memory and the computer code are further configured to with the at least one processor cause the apparatus to at least:
   determine audio sources with energy at lower frequencies than the at least one first audio source and the at least one second audio source;
   determine further audio sources with energy at lower frequencies than the at least one first audio source and the at least one second audio source; and
   virtually reposition the determined audio sources away from the determined further audio sources.

5. The apparatus as claimed in claim 1, wherein the at least one non-transitory memory and the computer code are further configured to with the at least one processor cause the apparatus to at least: sort the at least one first audio source and the at least one second audio source based on whether the at least one first audio source or the at least one second audio source correspond to the predetermined type of audio source by virtually repositioning locations of the at least one first audio source and the at least one second audio source that correspond to the predetermined type of audio source before the at least one first audio source and the at least one second audio source that do not correspond to the predetermined type of audio source.

6. The apparatus of claimed in claim 1, wherein the at least one non-transitory memory and the computer code are further configured to with the at least one processor cause the apparatus to at least: virtually reposition further audio sources relative to the at least one first audio source corresponding to the predetermined type of audio source and the at least one second audio source, wherein the at least one second audio source corresponds to environmental noise.

7. The apparatus of claimed in claim 1, wherein virtually repositioning locations of audio sources that are determined to correspond to the predetermined type of audio source further comprises taking into account already virtually positioned locations of audio sources.

8. The apparatus as claimed in claim 1, wherein the at least one non-transitory memory and the computer code are further configured to with the at least one processor cause the apparatus to at least:
   receive an input indicating a virtual position of the at least one first audio source; and
   virtually reposition the at least one first audio source based on the input.

9. The apparatus as claimed in claim 1, wherein the parametric audio representation for each of the at least one first audio source and the at least one second audio source comprises parameters describing at least one of: a direction, a distance, or a loudness of the at least one first audio source and the at least one second audio source from a location of the listener.

10. A method comprising:
    analyzing a first audio signal to locate at least one first audio source, wherein the at least one first audio source has a virtual location with respect to a listener during reproduction of the first audio signal using a device;
    determining the at least one first audio source corresponds to a predetermined type of audio source;
    analyzing a second audio signal generated from an environment surrounding the device to determine a direction of at least one second audio source with respect to at least one microphone of the device;
    creating a parametric audio representation for each of the at least one first audio source and the at least one second audio source; and
    using the parametric representation of the at least one first audio source and the at least one second audio source, virtually repositioning the at least one first audio source away from the at least one second audio source based on the determination that the at least one first audio source corresponds to the predetermined type of audio source.

11. The method as claimed in claim 10, wherein the predetermined type of audio source is speech.

12. The method as claimed in claim 10, wherein virtually repositioning the at least one first audio source is based on an ordered list.

13. The method as claimed in claim 10, further comprising:
    determining audio sources with energy at lower frequencies than the at least one first audio source and the at least one second audio source;
    determining further audio sources with energy at lower frequencies than the at least one first audio source and the at least one second audio source; and
    virtually repositioning the determined audio sources away from the determined further audio sources.

14. The method as claimed in claim 10, further comprising sorting the at least one first audio source and the at least one second audio source based on whether the at least one first audio source and the at least one second audio source correspond to the predetermined type of audio source by virtually repositioning locations of the at least one first audio source and the at least one second audio source that correspond to the predetermined type of audio source before the at least one first audio source and the at least one second audio source that do not correspond to the predetermined type of audio source.

15. The method as claimed in claim 10, further comprising virtually repositioning further audio sources relative to the at least one first audio source corresponding to the predetermined type of audio source and the at least one second audio source, wherein the at least one second audio source corresponds to environmental noise.

16. The method of claimed in claim 10, wherein virtually repositioning locations of audio sources that are determined to correspond to the predetermined type of audio source further comprises taking into account already virtually positioned locations of audio sources.

17. The method as claimed in claim 10, further comprising:
   receiving an input indicating a virtual position of the at least one first audio source; and
   virtually repositioning the least one first audio source based on the input.

18. A computer program product comprising at least one non-transitory computer readable storage medium, the at least one non-transitory computer readable storage medium comprising computer-executable program code stored therein, the computer-executable program code comprising instructions for:
   analyzing a first audio signal to locate at least one first audio source, wherein the at least one first audio source has a virtual location with respect to a listener during reproduction of the first audio signal using a device;
   determining the at least one first audio source corresponds to a predetermined type of audio source;
   analyzing a second audio signal generated from an environment surrounding the device to determine a direction of at least one second audio source with respect to at least one microphone of the device;
   creating a parametric audio representation for each of the at least one first audio source and the at least one second audio source; and
   using the parametric representation of the at least one first audio source and the at least one second audio source, virtually repositioning the at least one first audio source away from the at least one second audio source based on the determination that the at least one first audio source corresponds to the predetermined type of audio source.

19. The computer program product as claimed in claim 18, wherein the predetermined type of audio source is speech.

20. The computer program product as claimed in claim 18, wherein virtually repositioning the at least one first audio source is based on an ordered list.

21. The computer program product as claimed in claim 18, wherein the computer-executable program code further comprises instructions for
   determining audio sources with energy at lower frequencies than the at least one first audio source and the at least one second audio source;
   determining further audio sources with energy at lower frequencies than the at least one first audio source and the at least one second audio source; and
   virtually repositioning the determined audio sources away from the determined further audio sources.

* * * * *